(12) United States Patent
Jones et al.

(10) Patent No.: US 6,194,356 B1
(45) Date of Patent: Feb. 27, 2001

(54) GELLING COMPOSITION FOR WELLBORE SERVICE FLUIDS

(75) Inventors: Timothy Gareth J. Jones, Cottenham; Gary J. Tustin, Cambridge, both of (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/210,484

(22) Filed: Dec. 11, 1998

(30) Foreign Application Priority Data

Dec. 13, 1997 (GB) .................................................. 9726335

(51) Int. Cl.⁷ .................... lp;1pC09K 3/00; E21B 43/16

(52) U.S. Cl. .......................... 507/225; 507/209; 507/230; 507/903; 507/921; 507/200; 166/305.1

(58) Field of Search .................................... 507/903, 209, 507/211, 214, 215, 216, 222, 225, 921, 230, 200; 166/305.1

(56) References Cited

U.S. PATENT DOCUMENTS

| | | |
|---|---|---|
| 3,342,261 | 9/1967 | Bond . |
| 3,368,624 | 2/1968 | Heuer et al. . |
| 3,490,533 | 1/1970 | McLaughlin . |
| 3,530,940 | 9/1970 | Dauben et al. . |
| 3,759,325 | 9/1973 | Gogarty . |
| 3,826,311 | 7/1974 | Szabo et al. . |
| 3,830,302 | 8/1974 | Dreher et al. . |
| 3,993,133 | 11/1976 | Clampitt . |
| 4,044,833 | 8/1977 | Volz . |
| 4,148,736 | 4/1979 | Meister . |
| 4,192,753 | 3/1980 | Pye et al. . |
| 4,300,634 | 11/1981 | Clampitt . |
| 4,532,052 | 7/1985 | Weaver et al. . |
| 4,615,825 | 10/1986 | Teot et al. . |
| 4,643,255 | 2/1987 | Sandiford et al. . |
| 4,665,986 | 5/1987 | Sandiford . |
| 4,676,316 | 6/1987 | Mitchell . |
| 4,683,949 | 8/1987 | Sydank et al. . |
| 4,694,906 | 9/1987 | Hutchins et al. . |
| 4,695,389 | 9/1987 | Kubala . |
| 4,725,372 | 2/1988 | Teot et al. . |
| 4,735,731 | 4/1988 | Rose et al. . |
| 4,830,108 | 5/1989 | Hazlett et al. . |
| 4,844,163 | 7/1989 | Hazlett et al. . |
| 4,911,241 | 3/1990 | Williamson et al. . |
| 4,960,821 | * 10/1990 | Peiffer ................................... 524/534 |
| 4,975,482 | 12/1990 | Peiffer . |
| 5,036,136 | 7/1991 | Peiffer . |
| 5,093,448 | 3/1992 | Peiffer . |
| 5,101,903 | 4/1992 | Llave et al. . |
| 5,258,137 | 11/1993 | Bonekamp et al. . |
| 5,551,516 | 9/1996 | Norman et al. . |
| 5,782,300 | * 7/1998 | James et al. .......................... 507/924 |
| 5,929,002 | * 7/1999 | Joyce et al. ........................... 507/211 |
| 5,964,295 | * 10/1999 | Brown et al. ......................... 507/240 |

FOREIGN PATENT DOCUMENTS

| | | |
|---|---|---|
| 0835983 | 9/1997 | (EP) . |
| WO 92/02708 | 2/1992 | (WO) . |
| WO 92/15769 | 9/1992 | (WO) . |

OTHER PUBLICATIONS

Li, X., et al. "Polymer–Induced Microstructural Transitions in Surfactant Solutions", *J. Phys. Chem.*, vol. 99, No. 27, (1995). pp. 10865–10878.

* cited by examiner

*Primary Examiner*—Philip Tucker
(74) *Attorney, Agent, or Firm*—Robin C. Nava; Maryam Bani-Jamali; Thomas Mitchell

(57) ABSTRACT

A wellbore service fluid comprising viscoelastic surfactants in combination with cross-linkable, preferably hydrophobically modified, water soluble polymers is described, particularly applicable to water control operations.

12 Claims, 2 Drawing Sheets

GELLING COMPOSITION FOR WELLBORE SERVICE FLUIDS

The present invention relates to viscoelastic surfactant based gelling composition for wellbore service fluids. More particularly it relates to viscoelastic surfactant based gelling composition for selectively reducing the flow of subterranean aqueous fluids into a well while maintaining the hydrocarbon production.

BACKGROUND OF THE INVENTION

Various types of wellbore fluids are used in operations related to the development, completion, and production of natural hydrocarbon reservoirs. The operations include fracturing subterranean formations, modifying the permeability of subterranean formations, or sand control. Other applications comprise the placement of a chemical plug to isolate zones or complement an isolating operations. The fluids employed by those operations are known as drilling fluids, completion fluids, work over fluids, packer fluids, fracturing fluids, conformance or permeability control fluids and the like.

Of particular interest with regard to the present inventions are fluids for water control applications, as during the life cycle of a hydrocarbon well, e.g., a well for extracting oil or natural gas from the Earth, the producing well commonly also yields water. In these instances, the amount of water produced from the well tends to increase over time with a concomitant reduction of hydrocarbon production. Frequently, the production of water becomes so profuse that remedial measures have to be taken to decrease the water/hydrocarbon production ratio. As a final consequence of the increasing water production, the well has to be abandoned.

In many cases, a principal component of wellbore service fluids are gelling compositions, usually based on polymers or viscoelastic surfactants.

Viscoelastic surfactant solutions are usually formed by the addition of certain reagents to concentrated solutions of surfactants, which most frequently consist of long-chain quaternary ammonium salts such as cetyltrimethylammonium bromide (CTAB). Common reagents which generate viscoelasticity in the surfactant solutions are salts such sodium salicylate and sodium isocyanate and non-ionic organic molecules such as chloroform. The electrolyte content of surfactant solutions is also an important control on their viscoelastic behaviour.

Further references related to the use of viscoelastic surfactants as wellbore service fluids can be found for example in U.S. Pat. No. 4,695,389, U.S. Pat. No. 4,725,372, and U.S. Pat. No. 5,551,516.

There has been considerable interest in the viscoelastic gels formed from the solutions of certain surfactants when the concentration significantly exceeds the critical micelle concentration. The surfactant molecules aggregate into worm-like micelles which can become highly entangled at these high concentrations to form a network exhibiting elastic behaviour. These surfactant gels are of considerable commercial interest, including application as oil well fracturing fluids.

The viscoelasticity of the surfactant solutions appears invariably to form rapidly on mixing the various components. The resulting high viscosities of the viscoelastic gels can make handling or placement difficult. For example, placement of a uniform surfactant gel in a porous medium is difficult since injection of the gel in the medium can lead to the separation of the surfactant from the solute by a filtration process. Any application of viscoelastic surfactant solutions which requires their transport or placement after their preparation would benefit from a method of controlling their viscosities and gel times.

The gelation of high molecular weight polymers ($M_w > 10^6$ g/mol) has been extensively used in the development of water-based treatment fluids for water control is further described for example by R. D. Sydansk in "Acrylamide-polymer/chromium(III)-carboxylate gels for near wellbore matrix treatments", 7th SPE Symp. Enhanced Oil Recovery, Tulsa, Okla., April 1988, SPE/DoE 20214, or by R. S. Seright in: "placement of gels to modify injection profiles", SPE/DoE Symp. Enhanced Oil Recovery, Tulsa, Okla., April 1994, SPE 27740. Typically for those methods, an aqueous solution of a high molecular weight polymer, such as a polyacrylamide/polyacrylate copolymer (a so-called partially-hydrolysed polyacrylamide), is gelled in situ in a porous formation using a metal crosslinker such as $Cr^{3+}$ or small water-soluble organic crosslinkers such as formaldehyde and formaldehyde/phenol. Other water-soluble polymers such as poly(vinyl alcohol), the polysaccharide guar gum and the copolymer poly(vinylpyrrolidone-co-2-acrylamido-2-methyl-1-propanesulphonic acid) which can be crosslinked with a variety of crosslinking agents such as $Zr^{4+}$ and boric acid.

A more recent approach is described by A. Keller and K. A. Narh in: "The effect of counterions on the chain conformation of polyelectrolytes, as assessed by extensibility in elongational flow: the influence of multiple valency", *J. Polym. Sci.: Part B: Polymer Phys.*, 32, 1697–1706 (1994). It includes the crosslinking of poly(sodium 4-styrenesulphonate) using $Al^{3+}$ ions to form a gel. The concentration of the high molecular weight hydrophilic polymers used to form hydrogels is typically in the range 3–10 g/l.

Copolymers containing polar and non-polar segments are described for example in U.S. Pat. No. 4,776,398. The copolymers are cross-linked in subterranean formations so as to control the permeability of the formation layer before injecting a driving fluid into injector wells.

Furthermore, there have been a number of published studies of the physical gels which are formed by polymer-surfactant interactions. The gelation and viscoelastic behaviour results from specific interactions between the polymer chains and the micelles formed from assembled surfactant monomers. Commonly, the polymers have some fraction of hydrophobic groups on their chains which are associated with (or solubilised in) the surfactant micelle; see for example Sarrazin-Cartalas, A., Iliopoulos, I., Audebert, R. and Olsson, U., "Association and thermal gelation in mixtures of hydrophobically modified polyelectrolytes and nonionic surfactants", *Langmuir*, 10, 1421–1426 (1994).

Piculell, L., Thuresson, K. and Ericsson, O., in: "surfactant binding and micellisation in polymer solutions and gels: binding isotherms and their consequences", *Faraday Discuss.*, 101, 307–318 (1995).and Loyen, K., Iliopoulos, I., Audebert, R. and Olsson, U., in: "Reversible thermal gelation in polymer/surfactant systems. Control of gelation temperature", *Langmuir*, 11, 1053–1056 (1995) have given recent accounts of these polymer-surfactant gels. A common example of a polymer-surfactant gel is an aqueous solution containing the polymer hydroxypropylcellulose and the surfactant sodium dodecylsulphate as described for example by Wang, G., Lindell, K. and Olofsson, G., in: "On the thermal gelling of ethyl (hydroxyethyl) cellulose and sodium dodecyl sulfate. Phase behaviour and temperature scanning calorimetric response", *Macromolecules*, 30, 105–112 (1997).

The object of this present invention is therefore to provide improved compositions for wellbore service fluids based on viscoelastic surfactants. It is a specific object of the invention to enhance the gel strength of such compositions. It is a further specific object of the invention to provide such compositions for water control operations in hydrocarbon wells.

SUMMARY OF THE INVENTION

The objects of the invention are achieved by methods and compositions as set forth in the appended independent claims.

According to the invention there is provided a wellbore service fluid comprising viscoelastic surfactants and cross-linkable hydrophobically modified water-soluble polymers. Polymers as within the scope of the present invention are defined as molecules having a molecular mass of more than $10^3$, preferably more than $10^4$.

The cross-linkable hydrophobically modified water-soluble polymers preferably comprises low concentrations (0.5–5 mole percent) of hydrophobic monomers which co-polymerise with the hydrophilic monomers to form random or block copolymers. The hydrophilic part of the polymer, which constitutes preferably 95–99.5 mole percent of the polymer chain, contain in a preferred embodiment at least some small fraction of monomeric groups which can be chemically cross-linked to produce a rigid gel. Alternatively, the hydrophobic groups themselves can contain chemical functions which can be the sites of cross-linking.

Chemical cross-linking is defined as forming a chemical bond between the cross-linked polymers. Chemical cross-linking is understood to be stable and thermally irreversible. Some of the advantages in the use of hydrophobically modified polymers are responsiveness to hydrocarbons resulting in a reduction in the adhesive strength of gels and an extreme retardation of gelation, and solubilization of large organic cross-linking agents.

The cross-linking agents can be either inorganic ions (or ionic complexes) or polar organic molecules. When the polymer contains ionic groups such as carboxylate or sulphonate functions the polymer chains can be cross-linked by inorganic ions such as chromium(III) or zirconium(IV), frequently in the presence of monomeric ligands, such as acetate or adipate ions, to control the rate of cross-linking. Alternatively, organic cross-linking agents can be used. For example, the amide groups on poly(acrylamide) can be cross-linked with formaldehyde or a mixture of formaldehyde and phenol. The disadvantages of using formaldehyde or similar small molecules are their toxicity and issues of disposal. The larger reagents such as hexanal and heptanal which are not classed as toxic would be suitable cross-linking agents but are not sufficiently soluble in water to crosslink normal hydrophilic polymers such as the poly(acrylamide)/poly(acrylate) copolymer. However, these larger cross-linking agents are readily solubilised in aqueous solutions by hydrophobically-modified poly(acrylamide) polymers and can thence cross-link them.

Viscoelastic surfactants employed by the current invention are described for example in the above cited U.S. Pat. No. 4,695,389, U.S. Pat. No. 4,725,372, and U.S. Pat. No. 5,551,516 and literature referred to therein.

A preferred composition in accordance with the present invention comprises a viscoelastic surfactants and an agent to control the ion concentration within the composition. The ion concentration is used as means to control or delay the onset of gelation in surfactant based viscoelastic fluids after the fluid has been mixed.

The control can be achieved by at least three different mechanisms:

the delayed release of a specific counter-ion such as the formation of the salicylate anion by ester hydrolysis;

the controlled removal of a hydrogen bonding modifier such as urea or guanidine hydrochloride in surfactant systems where hydrogen bonding is the dominant interaction between the entangled micelles; or the controlled change in the ionic composition of the surfactant solution.

This use of an internal delayed release (removal) of a reagent which promotes (inhibits) the formation of viscoelastic gels from the surfactant solutions is seen as advantageous as the onset of viscoelasticity can be controlled. After the surfactant has formed a viscoelastic gel the polymer can be cross-linked to produce a rigid chemical gel. In contrast to the known physical gels produced by polymer-surfactant interactions described above, the surfactant and polymer gels described herein do not interact significantly and both the surfactant and the polymer in separate aqueous solutions will give viscoelastic gels under the conditions prevailing in the mixed solution.

The fluid is able to undergo a two-stage gelation process. The solution containing the surfactant and the polymer can be initially at low viscosity, if the onset of viscoelasticity is delayed by a suitable method, which may facilitate the transport or placement of the solution. After some predetermined time the surfactant micelles in the solution aggregate and entangle to form a viscoelastic (physical) gel. This gel can be designed to show some responsiveness to external conditions. For example, the viscoelasticity of the gel can be rapidly destroyed in contact with hydrocarbons and other organic solvents but maintained for many hours in contact with water. Alternatively, the viscoelasticity of the solution can be temporarily eliminated by raising the temperature but recovered on cooling. After a second predetermined time the polymer can be cross-linked using a suitable chemical cross-linker. The cross-linked polymer gel forms within, and largely independently of, the surfactant gel. The final gel behaves as a chemical gel which is significantly less responsive to its external physical and chemical environment. For example, the viscoelasticity of the final gel is not significantly affected by contact with hydrocarbon.

These and other features of the invention, preferred embodiments and variants thereof, and further advantages of the invention will become appreciated and understood by those skilled in the art from the detailed description and drawings following below.

MODE(S) FOR CARRYING OUT THE INVENTION

Two examples of a two-stage gelation process in an aqueous solution containing a viscoelastic surfactant and a high molecular weight cross-linkable polymer are described below in further detail.

Example 1 consists of a solution of 30 g/l of the surfactant N-erucyl-N,N-bis(2-hydroxyethyl)-N-methylammonium chloride (A)

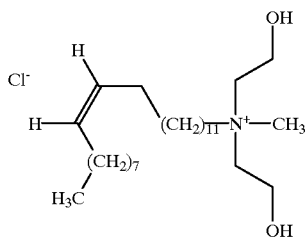

and 7 g/l of the hydrophobically-modified polymer poly(acrylamide) of molecular weight $2 \times 10^6$ g/mole with 3 mole percent of the hydrophobe n-nonyl acrylate

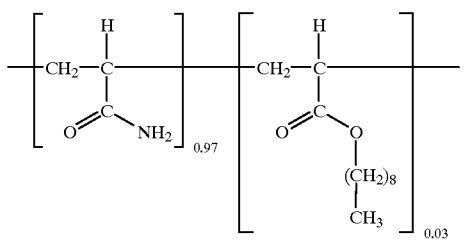

in a solution of 0.5 molar sodium chloride. The development of the viscoelasticity of the surfactant is delayed by the addition of urea phosphate (0.5 molar) and the hydrophobically-modified poly(acrylamide) is cross-linked by the addition of 1 g/l acetaldehyde.

Figure 1:
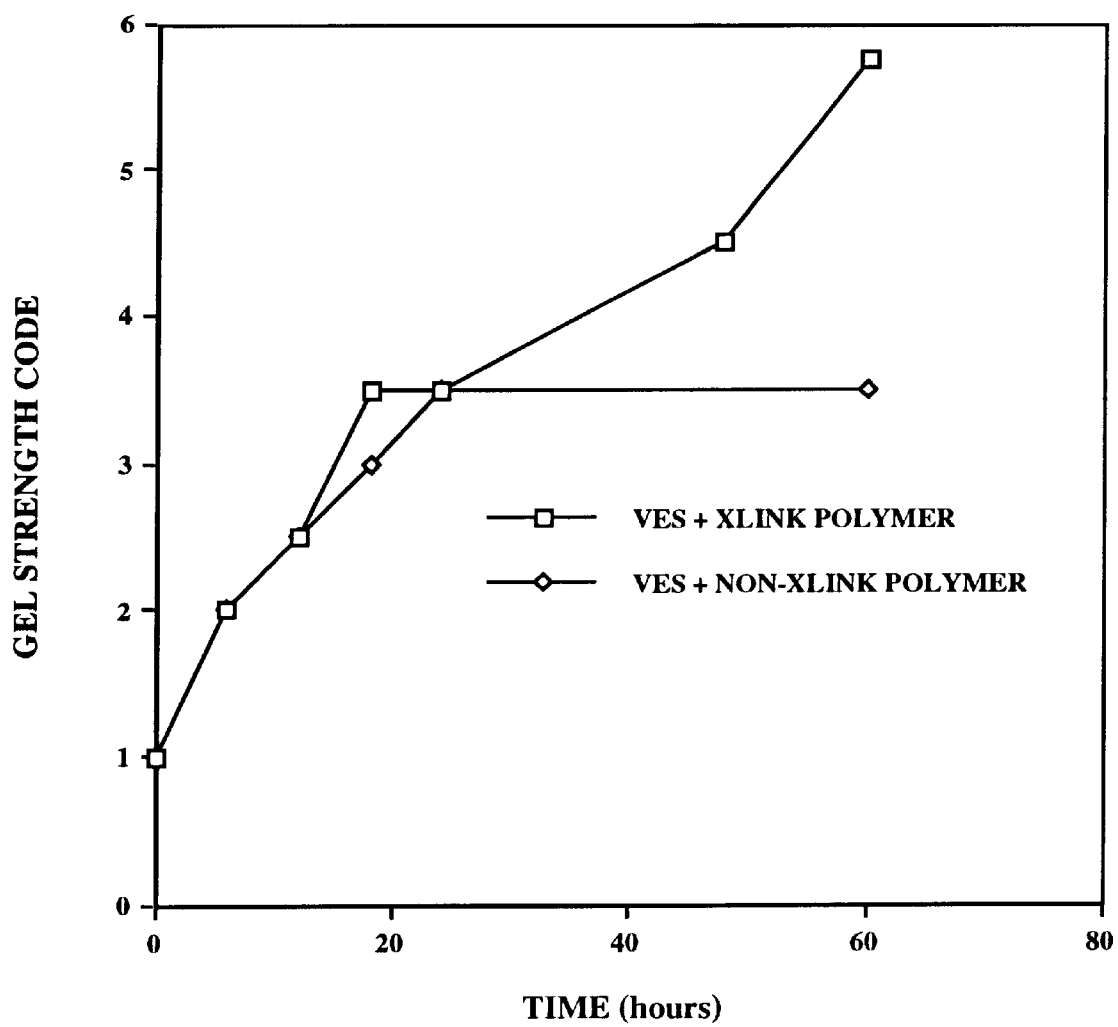
FIG. 1 shows the development of the gel strength code of the polymer/surfactant solution as a function of time at a temperature of 60° C.

FIG. 1 shows the development of the gel strength code of the polymer/surfactant solution as a function of time at a temperature of 60° C. The solution had a low initial viscosity as the development of the surfactant gel had been delayed by the presence of urea phosphate. As the urea phosphate broke down in the solution, the surfactant began to gel and the gel strength code increased to reach a value of 3.5 after about 18 hours. The gel strength of the solution continued to increase as the poly(acrylamide) cross-linked to form a chemical gel and after 60 hours the gel strength had reached a value of almost 6. Between the about 18 and 24 hours the solution remained at the limiting gel strength of the surfactant solution alone. For comparison FIG. 1 also shows the development of gel strength in a similar polymer/surfactant solution but without the addition of the acetaldehyde cross-linker. After 60 hours at 60° C. the solution had reached only gel strength 3.5 which was the limiting gel strength of the viscoelastic surfactant solution.

The polymers used in these sequential surfactant and polymer gels can be any suitable high molecular weight water-soluble polymer which can be chemically cross-linked. Common water-soluble polymers include poly(acrylamide), poly(vinyl alcohol), poly(vinylpyrrolidone)/poly(2-acrylamido-2-methyl-1-propanesulphonic acid) copolymer and hydrophobically-modified polymers such as the hydrophobically-modified poly(acrylamide) used herein. The cross-linking of hydrophobically-modified polymers is described below.

Figure 2:
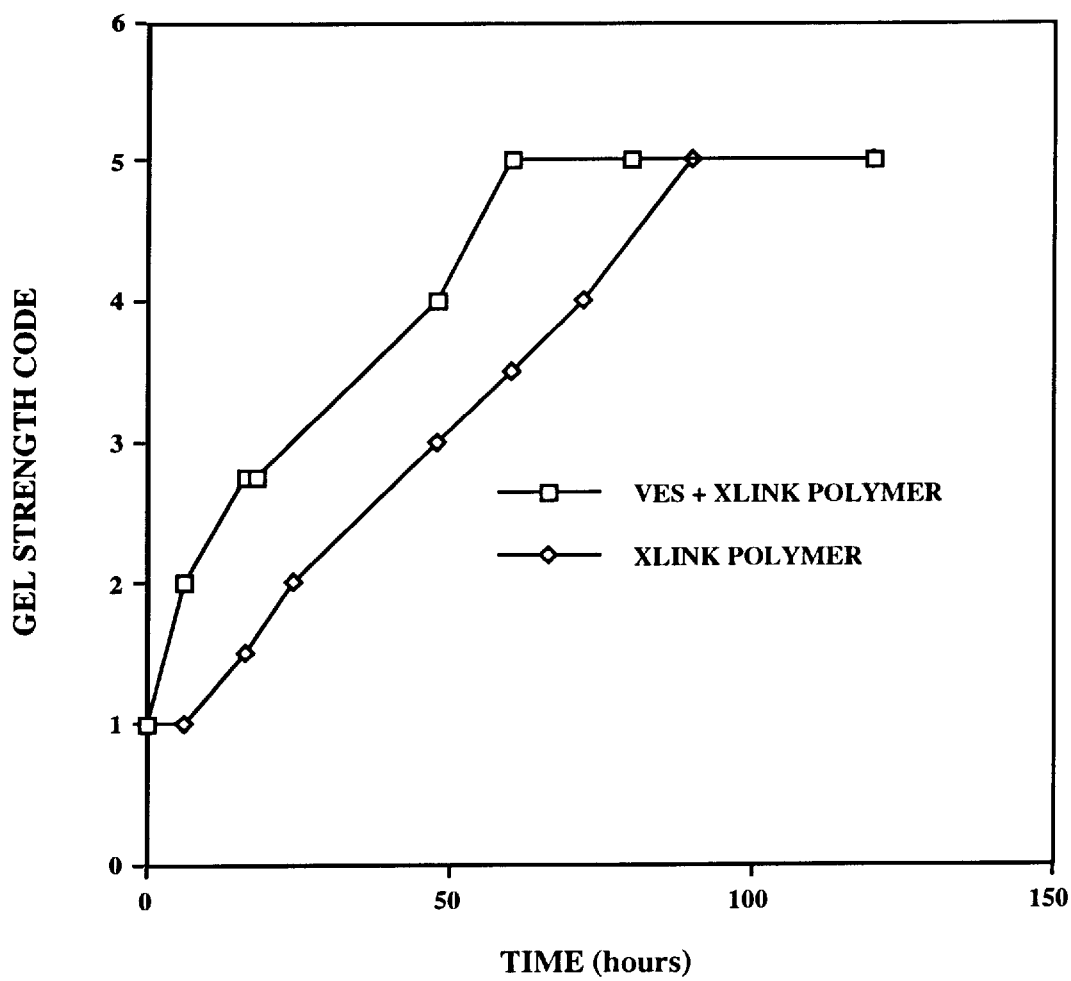
FIG. 2 shows the dependence of the gel strength of the solution as a function of time at 90° C.

The second example consists of the surfactant N-erucyl-N,N-bis(2-hydroxyethyl)-N-methylammonium chloride (15 g/l) and the hydrophobically-modified poly(acrylamide), as used in the previous example, in an aqueous solution of 0.5 molar urea phosphate and 0.5 molar sodium chloride. The chemical crosslinker for the hydrophobically-modified poly(acrylamide) was principally acetaldehyde which was produced in situ by the hydrolysis of the 2-chloroethanol added to the solution. FIG. 2 shows the dependence of the gel strength of the solution as a function of time at 90° C. Between 16 and 24 hours the solution reached a limiting gel strength code of about 3 which was the limiting value for the viscoelastic surfactant solution. After about 60 hours the solution had reached a limiting gel strength of 5 which corresponded to a rigid chemical gel. For comparison FIG. 2 also shows the development of gel strength in the hydrophobically-modified poly(acrylamide) solution in the absence of the surfactant. It is clear that at early time (at a time less than about 20 hours) the gel strength of the surfactant-polymer solution is dominated by the presence of the surfactant; only after a time of about 50 hours can increases in the gel strength of the solution be attributed to the chemical cross-linking of the polymer. It should also be noted that the gelation of the viscoelastic surfactant has been delayed by the addition of the urea phosphate. In the absence of the urea phosphate the surfactant gel would form immediately on mixing and the gel strength code would be 2.5–5.0.

In another example, a solution containing poly(acrylamide) (7 g/l), N-erucyl-N,N-bis(2-hydroxyethyl)-N-methylammonium chloride (1.5%), Urea phosphate (0.5 molar), Brine (0.5 molar) and 2-chloroethanol (1%) was prepared and heated to 60 C for 12 h and a code 3 physical gel that was oil sensitive was formed. Further heating at 90 C for 48 hours formed a code 5 chemical gel with no oil sensitivity. Similar results were observed replacing in the above solution the poly(acrylamide) by hydrophobically-modified poly(acrylamide).

What is claimed is:

1. A wellbore service fluid comprising viscoelastic surfactants in combination with cross-linkable water soluble polymers to be injected through a wellbore from surface location into a subterranean formation, wherein the fluid further comprises an agent capable of delaying the onset of gelation of the viscoelastic surfactants.

2. A wellbore service fluid comprising viscoelastic surfactants in combination With cross-linkable water soluble polymers to be injected through a wellbore from surface location into a subterranean formation, wherein the fluid further comprises a cross-linking agent.

3. A method for treating subterranean formation, comprising the steps of injecting a fluid from a surface location into said subterranean formation, wherein said fluid comprises viscoelastic surfactants in combination with cross-linkable water soluble polymers, said fluid further comprising an agent capable of delaying the onset of gelation of the viscoelastic surfactants, and letting said fluid form a gel within said formation.

4. A method for treating subterranean formation, comprising the steps of injecting a fluid from a surface location into said subterranean formation, wherein said fluid comprises viscoelastic surfactants in combination with cross-linkable water soluble polymers, said fluid further comprising a cross-linking agent, and letting said fluid form a gel within said formation.

5. The wellbore service fluid of claim 1, wherein said cross-linkable water soluble polymers comprise cross-linkable hydrophobically modified water soluble polymers.

6. The wellbore service fluid of claim 2, wherein said cross-linkable water soluble polymers comprise cross-linkable hydrophobically modified water soluble polymers.

7. The wellbore service fluid of claim 1, further comprising a cross-linking agent.

8. The wellbore service fluid of claim 5, further comprising a cross-linking agent.

9. The method of claim 3, wherein said cross-linkable water soluble polymers comprise cross-linkable hydrophobically modified water soluble polymers.

10. The method of claim 4, wherein said cross-linkable water soluble polymers comprise cross-linkable hydrophobically modified water soluble polymers.

11. The method of claim 3, wherein said fluid further comprises a cross-linking agent.

12. The method of claim 9, wherein said fluid further comprises a cross-linking agent.

* * * * *